US007100153B1

(12) United States Patent
Ringseth et al.

(10) Patent No.: US 7,100,153 B1
(45) Date of Patent: Aug. 29, 2006

(54) COMPILER GENERATION OF A LATE BINDING INTERFACE IMPLEMENTATION

(75) Inventors: Paul F. Ringseth, Redmond, WA (US); Sridhad S. Madhugiri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 633 days.

(21) Appl. No.: 09/611,402

(22) Filed: Jul. 6, 2000

(51) Int. Cl.
*G06F 9/45* (2006.01)
*G06F 9/44* (2006.01)

(52) U.S. Cl. ........................ 717/140; 719/331; 719/332

(58) Field of Classification Search ................ 717/148, 717/153, 162–167, 107–108, 140; 709/312–316; 719/331–332
See application file for complete search history.

(56) References Cited

U.S. PATENT DOCUMENTS 5,467,472 A 11/1995 Williams et al.
5,515,536 A * 5/1996 Corbett et al. .............. 709/315
5,546,584 A * 8/1996 Lundin et al. .............. 709/315
5,842,205 A * 11/1998 Brann ........................... 707/4
5,842,220 A * 11/1998 De Groot et al. ........ 707/103 R
5,946,489 A * 8/1999 Yellin et al. ................ 717/147
5,987,529 A * 11/1999 Nakamura et al. .......... 709/328
5,999,728 A 12/1999 Cable
6,070,197 A * 5/2000 Cobb et al. ................. 719/315
6,167,564 A 12/2000 Fontana et al.
6,182,024 B1 1/2001 Gangopadhyay et al.
6,189,048 B1 * 2/2001 Lim et al. ................... 719/330
6,247,174 B1 * 6/2001 Santhanam et al. ......... 717/154
6,304,918 B1 * 10/2001 Fraley et al. ............... 709/322
6,347,342 B1 2/2002 Marcos et al.
6,385,769 B1 5/2002 Lewallen
6,389,491 B1 * 5/2002 Jacobson et al. ............. 710/62
6,408,342 B1 6/2002 Moore et al.
6,510,550 B1 1/2003 Hightower et al.
6,519,767 B1 * 2/2003 Carter et al. ................ 717/140
6,701,352 B1 * 3/2004 Gardner et al. ............. 709/218

OTHER PUBLICATIONS

"C++ Builder 5 Features & Benefits"; Jurgen Fesslmeier; Inprise Corporation Product Marketing; Jan. 25, 2000; pp. 1-19.*
"Borland C++ Builder 4 Unleashed"; Kent Reisdorph et al.; Sams Publishing; 1999; chapter 22.*
Richard Grimes, "Attribute Programming with Visual C++", Wrox Press, [online] "www.comdeveloper.com/articles/attribprog.asp", retrieved Apr. 24, 2000, pp. 11.*
Kraig Brockschmidt, *Inside OLE*, Second Edition, "Chapter 3, Type Information," Microsoft Programming Series, Microsoft Press, pp. 145-186, 1995.
Kraig Brockschmidt, *Inside OLE*, Second Edition, "Chapter 14, OLE Automation and Automation Objects," Microsoft Programming Series, Microsoft Press, pp. 635-730, 1995.

(Continued)

*Primary Examiner*—Kakali Chaki
*Assistant Examiner*—William H. Wood
(74) *Attorney, Agent, or Firm*—Klarquist Sparkman, LLP

(57) ABSTRACT

A compiler automatically generates a late binding interface implementation based upon programming language code and definition information. The programming language code is for implementing the late bound methods of the interface, while the definition information defines late binding interface features of the interface. The late binding interface implementation includes code for invoking one or more late bound methods through a late binding mechanism, and also can include code for directly invoking the one or more late bound methods through an early binding mechanism. The compiler can also generate client-side code for calling a late bound method of a late binding interface.

30 Claims, 15 Drawing Sheets

OTHER PUBLICATIONS

Kraig Brockschmidt, *Inside OLE*, Second Edition, "Chapter 15, OLE Automation Controllers and Tools," Microsoft Programming Series, Microsoft Press, pp. 731-760, 1995.

Al Major, *COM IDL & Interface Design*, "Chapter 4, Automation and Tool Support," Wrox Press, pp. 103-132, 1999.

Shepherd et al., *MFC Internals*, "Chapter 14, MFC and Automation," Addison-Wesley, pp. 581-617, 1996.

Jeff Prosise, *Programming Windows with MFC*, Second Edition, "Chapter 20, Automation," Microsoft Programming Series, Microsoft Press, pp. 1155-1223, 1999.

Shepherd et al., "The Visual Programmer," Microsoft Systems Journal, 11 pp., Feb. 1997 [online] [retrieved on Jun. 2, 2000 from http://www.microsoft.com/MSJ/0297/visualprog/visualprog0297.htm].

Shepherd et al., "The Visual Programmer," Microsoft Systems Journal, 8 pp., Jul. 1998 [online] [retrieved on Jun. 2, 2000 from http://www.microsoft.com/MSJ/0798/visualprog0798.htm].

Microsoft Developer Network, "TN039: MFC/OLE Automation Implementation," 6 pp. [online] [retrieved on May 23, 2000 from http://msdn.microsoft.com/library/devprods/vs6/visualc/vcmfc/_mfcnotes_tn039.htm].

Microsoft Developer Network, "TN065: Dual-Interface Support for OLE Automation Servers," 7 pp. [online] [retrieved on Jun. 2, 2000 from http://msdn.microsoft.com/library/devprods/vs6/visualc/vcmfc/_mfcnotes_tn065.htm].

Microsoft Developer Network, "Creation of Dispatch API Functions," 14 pp. [online] [retrieved on May 23, 2000 from http://msdn.microsoft.com/library/psdk/automat/chap5_82r7.htm].

Microsoft Developer Network, "LoadTypeLib," 2 pp. [online] [retrieved on May 23, 2000 from http://msdn.microsoft.com/library/psdk/automat/chap9_laxu.htm].

Microsoft Developer Network, "ITypeInfo Interface," 6 pp. [online] [retrieved on May 31, 2000 from http://msdn.microsoft.com/library/psdk/automat/chap9_24kl.htm].

Microsoft Developer Network, "IDispatch Interface," 20 pp. [online] [retrieved on May 23, 2000 from http://msdn.microsoft.com/library/psdk/automat/chap5_78v9.htm].

Microsoft Developer Network, "Automation Topics," 7 pp. [online] [retrieved on May 31, 2000 from http://msdn.microsoft.com/library/devprods/vs6/visualc/vccore/_core_automation_topics.htm].

Microsoft Developer Network, "ColeDispatchDriver," 2 pp. [online] [retrieved on May 23, 2000 from http://msdn.microsoft.com/library/devprods/vs6/visualc/vcmfc/_mfc_coldispatchdriver.htm].

Microsoft Developer Network, "Using ClassWizard," 8 pp. [online] [retrieved on May 23, 2000 from http://msdn.microsoft.com/library/devprods/vs6/visualc/vccore/_core_using_classwizard.htm].

Microsoft Developer Network, "CCmdTarget Class Members," 5 pp. [online] [retrieved on Jun. 2, 2000 from http://msdn.microsoft.com/library/devprods/vs6/visualc/vcmfc/_mfc_ccmdtarget_class_members.htm].

Microsoft Developer Network, "Dispatch Maps," 15 pp. [online] [retrieved on Jun. 1, 2000 from http://msdn.microsoft.com/library.devprods/vs6/visualc/vcmfc/_mfc_dispatch_maps.htm].

Laurence Vanhelsuwé, *Mastering Java Beans*, "Chapter 4, Bean Properties," Sybex Inc., pp. 148-209, 1997.

Ivor Horton, *Beginning Visual C++ 6*, "Chapter 13, Understanding Windows Programming," Wrox Press, pp. 523-559, 1998.

Ivor Horton, *Beginning Visual C++ 6*, "Chapter 14, Working with Menus and Toolbars," Wrox Press, pp. 561-591, 1998.

Ivor Horton, *Beginning Visual C++ 6*, "Chapter 24, Using the Active Template Library," Wrox Press, pp. 1009-1063, 1998.

Pinheiro da Silva et al., "User Interface Modelling with UML" 15 pp.

Grundy et al., "Towards a Unified Event-based Software Architecture," SIGSOFT 96 Workshop, pp. 121-125 (1996).

Needham et al., "ADAM: A Language-Independent, Object-Oriented, Design Environment for Modeling Inheritance and Relationship Variants in ADA 95, C++, and Eiffel," pp. 99-113 (1996).

"OMG Unified Modeling Language Specification," Version 1.3, pp. i-xx, 1-1-1-15 (Jun. 1999).

Quatrani, "Visual Modeling with Rational Rose and UML," Addison Wesley Longman, Inc., 10 pp. (Apr. 1998).

Aho et al., "Compilers, Principles, Techniques, and Tools," Addison-Wesley Publishing Co., pp. 1-78 (1988).

Object Management Group, *The Common Object Request Broker: Architecture and Specification, revision 2.3*, pp. i-xxv and 2-2-2-11 (Jun. 1999).

Mueller, *COM+ Developer's Guide*, pp. v-ix and 412, McGraw-Hill Companies (2000).

"Visual C++ Technology Preview Distributed at PDC," downloaded from the World Wide Web on Jan. 28, 2004.

\* cited by examiner

```
#define _ATL_ATTRIBUTES 1
#include "atlbase.h"
#include "atlcom.h"
extern "C" int printf(const char*, ...);

[project(name=MyLib, helpfile="test.res", helpcontext=12)];

[export] enum E {
   e1 = 17
};
[export] struct S {
   int i, j;
};
[dispinterface, helpstring("interface ITest")] __interface ITest : IDispatch {
   [id(34), propput] void Grade([in] E e0, [in] char c);
   [id(34), propget] void Grade([in] E e0, [out, retval] char* pc);
   [id(18)] HRESULT Score([in]S* a, [in]float b, [in]VARIANT c);
};

[coclass, progid(CTest.17), helpstring("interface CTest"), uuid(12341234-
1234-1234-1234-123412341234)]
struct CTest : ITest {
   void put_Grade(E e0, char c) {
      printf("CTest::put_Grade(e0=%d,c=%c)\n", e0, c);
   }
   void get_Grade(E e0, char* pc) {
      printf("CTest::get_Grade(e0=%d)\n", e0);
      *pc = 'A';
   }
   HRESULT Score(S* a, float b, VARIANT c) {
      printf("CTest::Score(a=%p,b=%f,c=%d)\n", a, b, c.iVal);
      return S_OK;
   }
};
```

```
#define _ATL_ATTRIBUTES 1
#include "atlbase.h"
#include "atlcom.h"
extern "C" int printf(const char*, ...);

#import "TestLib.tlb" embedded_idl

[project(name=MyLib, helpfile="test.res", helpcontext=12)];

[coclass, progid(CTest.17), helpstring("interface CTest"),
uuid(12341234-1234-1234-1234-123412341234)]
struct CTest : ITest {
   void put_Grade(E e0, char c) {
      printf("CTest::put_Grade(e0=%d,c=%c)\n", e0, c);
   }
   void get_Grade(E e0, char* pc) {
      printf("CTest::get_Grade(e0=%d)\n", e0);
      *pc = 'A';
   }
   HRESULT Score(S* a, float b, VARIANT c) {
      printf("CTest::Score(a=%p,b=%f,c=%d)\n", a, b, c.iVal);
      return S_OK;
   }
};
```

```
[coclass]
struct CTest : ITest ,
    /* + + + Added Baseclass */ public CComCoClass<CTest, &__uuidof(CTest)> ,
    /* + + + Added Baseclass */ public CComObjectRootEx<CComSingleThreadModel>
    /* + + + Added Baseclass */ public IProvideClassInfoImpl<&__uuidof(CTest)>
{
    void put_Grade(E e0, char c) {
        printf("CTest::put_Grade(e0=%d,c=%c)\n", e0, c);
    }
    void get_Grade(E e0, char* pc) {
        printf("CTest::get_Grade(e0=%d)\n", e0);
        *pc = 'A';
    }
    HRESULT Score(S* a, float b, VARIANT c) {
        printf("CTest::Score(a=%p,b=%f,c=%d)\n", a, b, c.iVal);
        return S_OK;
    }
}
```

```
//+ + + Start Injected Code
   virtual HRESULT STDMETHODCALLTYPE Invoke(
            /* [in] */ DISPID dispIdMember,
            /* [in] */ REFIID riid,
            /* [in] */ LCID lcid,
            /* [in] */ WORD wFlags,
            /* [out][in] */ DISPPARAMS *pDispParams,
            /* [out] */ VARIANT *pVarResult,
            /* [out] */ EXCEPINFO *pExcepInfo,
            /* [out] */ UINT *puArgErr)
   {
      HRESULT hr = S_OK;
      if (pDispParams = = 0) { return DISP_E_BADVARTYPE;}
      if (pVarResult != 0) { VariantInit(pVarResult);}
      switch (dispIdMember) {
      case 18:
         {
            S* i1 = (S*) V_RECORD(&pDispParams->rgvarg[2]);
            float i2 = V_R4(&pDispParams->rgvarg[1]);
            VARIANT i3 = pDispParams->rgvarg[0];
            hr = Score(i1, i2, i3);
            if (pVarResult != 0) {
               V_VT(pVarResult) = VT_ERROR;
               V_ERROR(pVarResult) = hr;
            }
            break;
         }
```

```
case 34:
   {
      if (wFlags & 4) {
         E i1 = (E) V_I4(&pDispParams->rgvarg[1]);
         char i2 = V_UI1(&pDispParams->rgvarg[0]);
         put_Grade(i1, i2);
         break;
      } else if (wFlags & 2) {
         E i1 = (E) V_I4(&pDispParams->rgvarg[1]);
         char* i2 = (char*) V_I1REF(&pDispParams->rgvarg[0]);
         get_Grade(i1, i2);
         if (pVarResult != 0) {
            V_VT(pVarResult) = VT_UI1 | VT_BYREF;
            V_I1REF(pVarResult) = (char*) i2;
         }
         break;
      }
   }
default:
   return DISP_E_MEMBERNOTFOUND;
}
return hr;
}
```

```
virtual HRESULT STDMETHODCALLTYPE GetIDsOfNames(
          /* [in] */ REFIID riid,
          /* [size_is][in] */ LPOLESTR *rgszNames,
          /* [in] */ UINT cNames,
          /* [in] */ LCID lcid,
          /* [size_is][out] */ DISPID *rgDispId)
{
   static LPOLESTR names[] = { L"Grade", L"Score" };
   static DISPID dids[] = { 34, 18 };
   for (unsigned int i = 0; i < cNames; ++i) {
      int fFoundIt = 0;
      for (unsigned int j = 0; j < sizeof(names)/sizeof(LPOLESTR); ++j) {
         if (lstrcmpW(rgszNames[i], names[j]) == 0) {
            fFoundIt = 1;
            rgDispId[i] = dids[j];
         }
      }
      if (fFoundIt == 0) {
         return DISP_E_UNKNOWNNAME;
      }
   }
   return S_OK;
}
```

```
HRESULT TypeInfoHelper(REFIID iidDisp, LCID /*lcid*/, ITypeInfo** ppTypeInfo)
{
   if (ppTypeInfo == NULL) {
      return E_POINTER;
   }
   *ppTypeInfo = NULL;
   TCHAR szModule1[_MAX_PATH];
   ::GetModuleFileName(_pModule->GetModuleInstance(), szModule1, _MAX_PATH);
   USES_CONVERSION;
   CComPtr<ITypeLib> spTypeLib;
   HRESULT hr = LoadTypeLib(T2OLE(szModule1), &spTypeLib);
   if (SUCCEEDED(hr)) {
      CComPtr<ITypeInfo> spTypeInfo;
      hr = spTypeLib->GetTypeInfoOfGuid(iidDisp, &spTypeInfo);
      if (SUCCEEDED(hr)) {
         *ppTypeInfo = spTypeInfo.Detach();
      }
   }
   return hr;
}
```

```
virtual HRESULT STDMETHODCALLTYPE GetTypeInfoCount(unsigned int*  pctinfo)
{
   if (pctinfo = = NULL) {
      return E_POINTER;
   }
   CComPtr<ITypeInfo> spTypeInfo;
   *pctinfo =
          (SUCCEEDED(TypeInfoHelper(__uuidof(ITest), 0, &spTypeInfo))) ? 1 : 0;
   return S_OK;
}
virtual HRESULT STDMETHODCALLTYPE GetTypeInfo(unsigned int iTInfo, LCID lcid, ITypeInfo** ppTInfo)
{
   if (iTInfo != 0) {
      return DISP_E_BADINDEX;
   }
   return TypeInfoHelper(__uuidof(ITest), lcid, ppTInfo);
}

//--- End Injected Code
};
```

COMPILER GENERATION OF A LATE BINDING INTERFACE IMPLEMENTATION

COPYRIGHT NOTICE/PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the software and data as described below and in the drawings hereto: Copyright© 2000, Microsoft Corporation, All Rights Reserved.

TECHNICAL FIELD

The present invention pertains to generation by a compiler of an implementation for a late binding interface. A compiler automatically generates a late binding interface implementation based upon programming language code and definition information for the late binding interface.

BACKGROUND OF THE INVENTION

To manage the complexity of long computer programs, computer programmers often adopt object-oriented programming techniques. With these techniques, a computer program is organized as multiple smaller modules called objects. These objects perform specified functions and interact with other objects in pre-defined ways. FIG. 1 shows several principles of object-oriented programming with reference to an object 100 that interacts in pre-defined ways with a client 140 (which can also be an object).

The object 100 encapsulates data 110, which represents the current state of the object 100. The data 110 can be organized as data elements such as properties of the object 100. The object 100 exposes member functions (alternatively called methods) 120, 122, and 124 that provide access to the data 110 or provide some other defined function or service. To access the data 110, the client 140 of the object 100 goes through a member function. In FIG. 1, the member functions 120, 122, 124 are grouped into an interface 126. FIG. 1 also includes an interface 130 (shown without member functions for simplicity).

The object 100 and the client 140 interact across the interfaces exposed by the object 100. For example, for the client 140 to invoke the member function 120, a function call in the client 140 identifies the member function 120, provides any data to be processed (e.g., input parameters for arguments), and indicates any data to be returned (e.g., output parameters for arguments, return values). Similarly, for the client 140 to set a value for a property of the data 110, the client 140 identifies the property and provides the value.

The client 140 initially identifies the member functions of the object 100 by name. Before the client 140 can access a member function of the object 100, the client's name for the member function must become associated with the actual member function in the object 100 in a binding process. Binding can occur at any of several different times, and the best time for binding depends on the situation.

When the client 140 and the object 100 are tightly integrated, it is often efficient to use early binding. With early binding, the names in the client 140 are associated with the actual respective member functions of the object 100. The client 140 directly operates upon the member functions of the object 100 through an interface.

FIG. 2 shows an object 200 that provides an early binding implementation of the interface ITest. The object 200 is designed according to Microsoft Corporation's Component Object Model ["COM"] and includes an instance data structure 202, a virtual function table 210 for ITest, and method implementations 221–226. The instance data structure 202 includes a pointer 204 to the virtual function table 210 and data 208, such as properties. In early binding, a client is compiled to use the virtual function table and function signatures of ITest. A client references the early binding interface using a pointer to the pointer 204. The virtual function table 210 includes a pointer for each member function of ITest. The pointers 211–213 correspond to the standard COM IUnknown methods QueryInterface, AddReference, and Release, and point to implementations 221–223, respectively. The pointers 214–216 correspond to the other methods of ITest, and point to implementations 224–226, respectively. For additional information about COM and early binding interfaces, see Kraig Brockschmidt, *Inside OLE*, second edition, Microsoft Press (1995).

While early binding works well for a tightly integrated object and client, an object might need to work with a client that cannot use a custom early binding mechanism for the object. In such situations, late binding works well. With late binding, an object exposes an intermediary interface. A client accesses late bound member functions of an object through this intermediary interface.

Late binding can be provided through numerous mechanisms. One mechanism uses tokens to identify the late bound member functions of an object. A client associates its member function names and property names with corresponding tokens. To invoke a late bound member function, the client passes the corresponding token to the intermediary interface, along with any arguments for the member function (typically packed into a generic data structure). The intermediary interface then calls the member function identified by the token. With late binding, names can be associated with tokens at run time or at compile time. If the association occurs at compile time, the tokens are still used to invoke late bound methods through the intermediary interface at run time, but a client can call the intermediary interface without first looking up a token for a name at run time.

FIG. 3 shows one type of intermediary interface, a dispatch interface implemented by a COM object 300. In FIG. 3, the dispatch interface provides a late binding mechanism for late bound member functions of ITest.

The object 300 includes an instance data structure 302, a virtual function table 310, and method implementations 324–327. The instance data structure includes a pointer 304 to the virtual function table 310 and data 308 (e.g., properties). The virtual function table 310 includes a pointer for each member function of ITest that is inherited from the interface IDispatch. Again, the pointers 311–313 correspond to the standard COM IUnknown methods QueryInterface, AddReference, and Release, and point to implementations not shown in FIG. 3. The pointers 314–317 correspond to the remaining IDispatch methods, and point to implementations 324–327, respectively.

By calling the method GetIDsOfNames, a client retrieves a dispatch identifier ["DISPID"] for a particular name of a late bound member function. A DISPID is a type of token that is passed to the dispatch interface to invoke a corresponding member function. In FIG. 3, a client could retrieve the DISPID 18 by querying GetIDsOfNames for the DISPID of the method Score.

A client calls Invoke, passing a DISPID for a late bound method, arguments packed into a generic data structure, and other information. The Invoke implementation 327 maps DISPIDs to the implementations 224–226 for the other, non-dispatch methods of ITest. The Invoke implementation 327 calls the appropriate method for the passed DISPID. If a client passed the DISPID 18 to Invoke, the Invoke implementation 327 would call the method Score. For additional information about the dispatch interface, see Kraig Brockschmidt, *Inside OLE*, second edition, Chapters 14 and 15, Microsoft Press (1995).

Late binding interfaces provide flexibility and power, but not without a price. Manually programming the extra layers of code for late binding interfaces has proven to be notoriously difficult and time-consuming for programmers. Writing the corresponding client side code for packing arguments to and unpacking arguments from the generic data structures has also proven difficult.

While several attempts have been made to simplify the programming of late binding interfaces, none has been completely successful. Typically, these attempts simplify the act of creating dispatch interface implementations, but add unnecessary run time overhead to the resulting implementations. In comparison, manually created dispatch interface implementations, though difficult to create, are relatively efficient when executing.

Microsoft Corporation provides type library support for dispatch interfaces. A type library object includes definition information about an interface, and can expose methods GetIDsOfNames and Invoke for the interface. To implement a dispatch interface in an object, a programmer can make use of these methods provided by the type library object. Although this hides the details of implementing the dispatch interface from the programmer, the resulting implementation requires numerous run time calls between the object and the type library object, which slows processing. Moreover, a type library implementation typically uses an early binding mechanism of a dual interface (an interface that has both early binding and late binding mechanisms). Essentially, the type library is used as a virtual function table, which is no more robust than a virtual function table for a custom interface—type library implementations are not very useful for distributed computing (e.g., with objects designed according to Microsoft Corporation's Distributed Component Object Model ["DCOM"]), where the server may be several versions newer than the client, and hence type library information may be out of date. For additional information about implementing dispatch interfaces with a type library, see Shepherd et al, *MFC Internals*, Chapter 14, "MFC and Automation," Addison Wesley (1996).

Microsoft Foundation Classes ["MFC"] also provides some support for implementing dispatch interfaces. MFC provides a high-level software tool called a wizard that simplifies the act of creating dispatch interface implementations. The wizard manipulates the source code for an object and helps create a dispatch map, which is a table that associates names with DISPIDs. At run time, the dispatch map is queried in multiple calls between the object and a special dispatch object. Getting DISPIDs through this mechanism is slow, as is invoking late bound methods. Further, having a wizard implement the dispatch interface can lead to source code that is confusing and unstable when changed by a programmer. If the definition for a member function changes, however, the programmer may need to change the confusing and unstable wizard-generated code. Finally, while MFC provides a dispatch implementation tool for MFC, the tool does not work for other platforms. For additional information about implementing dispatch interfaces with MFC, see Shepherd et al, *MFC Internals*, Chapter 14, "MFC and Automation," Addison Wesley (1996).

SUMMARY OF THE INVENTION

The present invention overcomes these problems by automatically generating a late binding interface implementation based upon programming language code and definition information for the late binding interface. The definition information can be embedded in the programming language code or imported as part of a type library or other file.

Given this definition information for the late binding interface, a compiler generates potentially thousands of lines of code that the programmer previously had to write when creating a late binding interface implementation. The implementation includes code for invoking methods through a late binding mechanism, and also can include code for directly invoking the methods through an early binding mechanism.

Generating late binding interface implementations in this way is simple, systematic, and easy for the programmer to do. This technique prevents run time errors due to incomplete implementation, and a generated implementation reflects the latest definition information for the late binding interface.

Client-side code for calling a late bound method of a late binding interface can also be generated, which simplifies the packing and unpacking of generic data structures used with the late binding interface implementations.

Additional features and advantages of the invention will be made apparent from the following detailed description of an illustrative embodiment that proceeds with reference to the accompanying drawings.

BRIEF DESCRIPTION OF THE DRAWINGS

FIG. 5 is a source code listing for a file having C++ source code with embedded IDL for a dispatch interface.

FIG. 6 is a source code listing for a file having C++ source code with imported definition information for a dispatch interface.

FIGS. 10*a*–10*f* are a source code listing representative of a compiler-generated dispatch interface implementation.

DETAILED DESCRIPTION OF AN ILLUSTRATIVE EMBODIMENT

The illustrative embodiment of the present invention is directed to automatically generating a dispatch interface implementation. A C++ compiler automatically generates the dispatch interface implementation based upon definition information for the dispatch interface and C++ source code for the methods invoked through the dispatch interface.

Although the illustrative embodiment addresses implementation of dispatch interfaces, the invention is also applicable to the implementation of dual interfaces, which combine dispatch interface and early binding features.

Moreover, the invention can be used with other object models (e.g., objects designed according to the Common Object Request Broker Architecture ["CORBA"] or according to Sun Microsystems' Java specifications) and other types of late binding interface implementations. In general, the present invention can be applied to software objects for which late binding interface implementations are generated from definition information and programming language code.

I. Computing Environment

Figure 1:
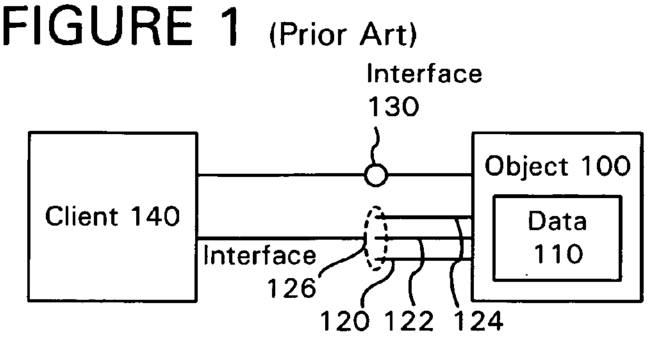
FIG. 1 is a block diagram of a software object and a client of the software object that interact across interfaces exposed by the software object according to the prior art.
Figure 2:
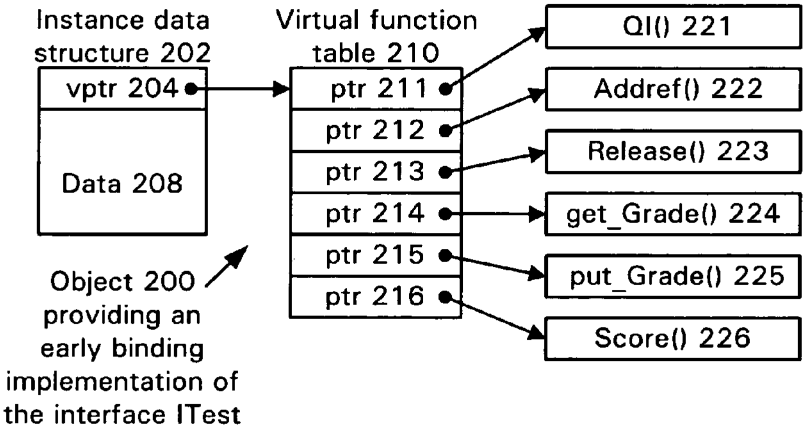
FIG. 2 is a block diagram of a COM object that provides an early binding COM implementation of the interface ITest according to the prior art.
Figure 3:
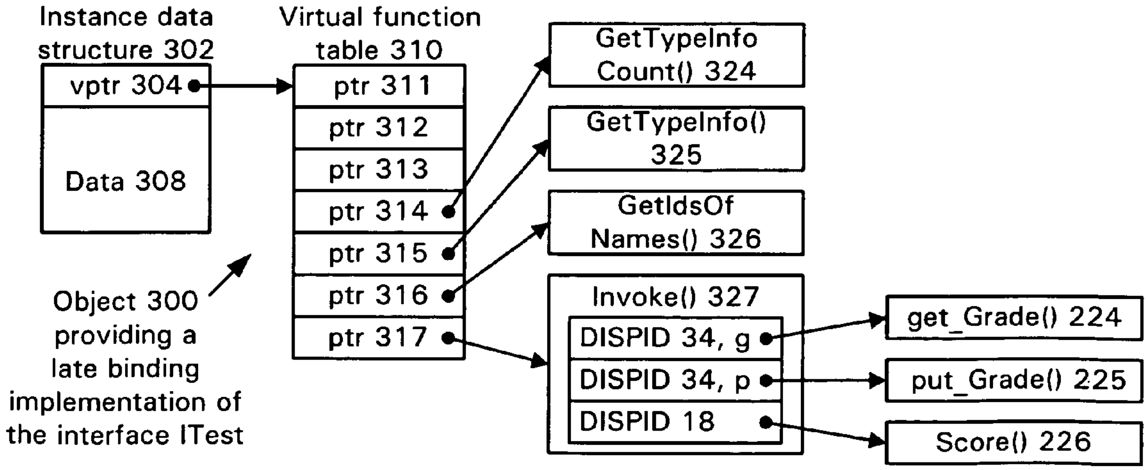
FIG. 3 is a block diagram of a COM object that provides a dispatch interface implementation of the interface ITest according to the prior art.
Figure 4:
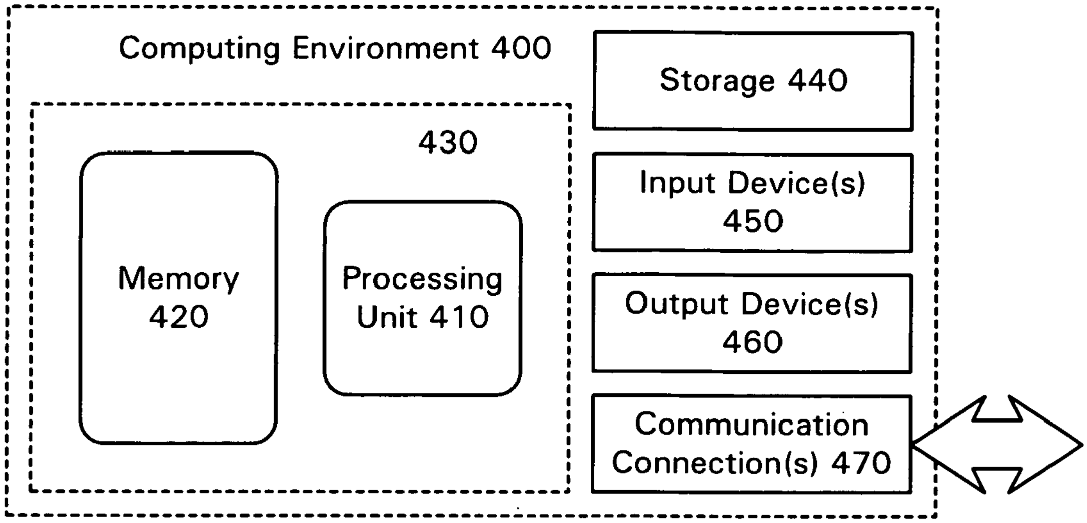
FIG. 4 is a block diagram of a computing environment that can be used to implement the illustrative embodiment.

FIG. 4 illustrates a generalized example of a suitable computing environment 400 in which the illustrative embodiment may be implemented. Computing environment 400 is not intended to suggest any limitation as to scope of use or functionality of the invention, as the present invention may be implemented in diverse general purpose or special purpose computing environments.

With reference to FIG. 4, computing environment 400 includes at least one processing unit 410 and memory 420. In FIG. 4, this most basic configuration is included within dashed line 430. The processing unit 410 executes computer-executable instructions and may be a real or a virtual processor. In a multi-processing system, multiple processing units execute computer executable instructions to increase processing power. Memory 420 may be volatile memory (e.g., registers, cache, RAM), non-volatile memory (e.g., ROM, EEPROM, flash memory, etc.), or some combination of the two.

A computing environment may have additional features. For example, computing environment 400 includes storage 440, one or more input devices 450, one or more output devices 460, and one or more communication connections 470. A bus, controller, network, or other interconnection mechanism (not shown) interconnects the components of computing environment 400. Typically, operating system software (not shown) provides an operating environment for other software executing in the computing environment 400, and coordinates activities of the components of the computing environment 400.

Storage 440 may be removable or non-removable, and includes magnetic disks, magnetic tapes or cassettes, CD-ROMs, DVDs, or any other medium which can be used to store information and which can be accessed within computing environment 400.

Input device 450 may be a touch input device such as a keyboard, mouse, pen, or trackball, a voice input device, a scanning device, or another device that provides input to computing environment 400. Output device 460 may be a display, printer, speaker, or another device that provides output from computing environment 400.

Communication connection 470 enables communication over a communication medium to another computing entity. The communication medium conveys information such as computer executable instructions or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The invention can be described in the general context of computer readable media. Computer readable media are any available media that can be accessed within a computing environment. By way of example, and not limitation, with computing environment 400, computer readable media include memory 420, storage 440, and communication media. Combinations of any of the above also fall within the definition of computer readable media.

The invention can be described in the general context of computer executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

II. Late Binding Interfaces

The illustrative embodiment of the present invention is directed to automatically generating dispatch interface, or "dispinterface," implementations. A dispatch interface inherits from IDispatch, and includes the IUnknown methods as well as four methods: GetTypeInfoCount, GetTypeInfo, GetIDsOfNames, and Invoke. An interface that inherits from IDispatch may be a custom interface or a dual interface, in which case other, non-dispatch methods are also directly accessible through the vtable for the interface. Alternative embodiments of the present invention are directed to automatically generating implementations for other types of late binding interfaces.

The following description highlights several features of IDispatch that are relevant to the illustrative embodiment. This section indicates type and definition information needed to implement a dispatch interface. For more information about IDispatch, see Kraig Brockschmidt, *Inside OLE*, second edition, Microsoft Press (1995).

The methods GetIDsOfNames and Invoke provide the core functionality of a dispatch interface. The invocation of other, non-dispatch methods takes place through GetIDsOfNames and Invoke. In alternative embodiments, other types of late binding interfaces have other mechanisms for mapping late bound method names to corresponding identifiers and calling late bound methods with such corresponding identifiers through an intermediary interface.

The method GetIDsOfNames maps a member and an optional set of argument names to a corresponding set of integer dispatch identifiers ["DISPIDs"]. The DISPIDs are used in subsequent calls to Invoke. GetIDsOfNames accepts from a client an array of names and a count of the names. The first element represents the member name, while the subsequent elements represent each of the member's arguments. GetIDsOfNames returns an array, each element of which contains a DISPID corresponding to one of the names passed in. Implementation of GetIDsOfNames requires definition information about member names and corresponding DISPIDs. In alternative embodiments, instead of DISPIDs, other types of identifiers are used in a late binding interface.

The method Invoke accepts a DISPID identifying a late bound member to call. Although a client can determine this DISPID at run time with the method GetIDsOfNames, it is also possible for a client to possess this information before run time. Thus, implementation of Invoke requires definition information about members and member names, member argument names and counts, along with any associated IDL attribute information and corresponding DISPIDs.

The method Invoke also accepts an array of flag values that indicate whether the member is to be invoked as a method, retrieved as a property, changed as a property, etc. For this reason, implementation of Invoke requires definition information about these flag values for the interface.

The arguments for the operation are passed from the client to the method Invoke in a DISPPARAMS structure, which is a type of generic data structure for arguments. For a method invocation, this structure contains an array of generic types containing the arguments and their types, a corresponding array of DISPIDs of named arguments (properties), and counts for the numbers of elements in the arrays. To implement code for unpacking arguments from a DISPPARAMS structure, a compiler requires type and definition information for member arguments. The compiler also needs this information to generate client-side code for packing arguments into a DISPPARAMS structure. Using this definition information, the method Invoke ensures that arguments passed to a late bound method are of the correct type and in the correct order. If possible, arguments passed as an incorrect type are coerced into a correct type before calling the late bound method.

The method Invoke returns a value from a late bound method in a VARIANT structure, which is a type of generic data structure for arguments. The VARIANT structure indicates a return value and a type for the return value. To implement packing and unpacking code for the VARIANT structure, the compiler again requires type and definition information for member arguments.

In alternative embodiments, late binding interfaces use other types of generic data structures to handle arguments for packing/unpacking and type coercion operations.

III. Definition Information and Source Code Files

Definition information for a dispatch interface can come from a type library or from interface definition language ["IDL"] information embedded in a C++ source code file. Given this definition information, the compiler generates potentially thousands of lines of code that a programmer previously had to write when creating a dispatch interface implementation. Alternative embodiments of the present invention work with different types of definition information. One alternative embodiment includes a Java object described with Java definition information (e.g., a JavaBean described with an associated information bean). Another alternative embodiment includes a CORBA-compliant object described with CORBA IDL. In general, the present invention can be applied to software objects for which late binding interface implementations are generated from definition information and programming language code.

FIGS. 5 shows an exemplary C++ source code file 500 with embedded IDL. The file 500 includes IDL defining the dispatch interface ITest as well as C++ source code for implementing the late bound methods of ITest in an object CTest. Alternatively, different IDL tags or different programming language constructs can convey equivalent definition information.

The embedded IDL defines dispatch features and type information for the dispatch interface in a declarative fashion. Embedded IDL constructs are identified in the file 500 by brackets "[" and "]" that mark the beginning and end of a set of one or more IDL attributes, respectively. The set of IDL attributes along with brackets is termed an IDL attribute tag. In general, an IDL attribute tag can be attached to any C++ programming construct, including an entire block or program. Various forms of IDL attribute-tag syntax are allowable. An IDL attribute can simply be listed, be set to a value, be set to a list of properties, etc. Commas separate multiple attributes in a single tag.

The file 500 includes numerous embedded IDL constructs. The code portion 510 includes user-defined types enum E and struct S, each annotated with the IDL attribute "export." As such, a compiler can use type information for E and S when creating code for packing and unpacking arguments.

The code portion 520 includes IDL attributes for the dispatch interface ITest, IDL attributes for the member functions of ITest, and IDL attributes for function arguments.

The "_interface," keyword marks the interface ITest. In accordance with COM, the "_interface" keyword semantically is a struct which contains pure virtual function members (virtual function members for which no implementation is specified that must be overridden in a derived class in order to create an object). The interface ITest inherits from IDispatch, and is annotated with the "dispinterface" IDL attribute tag. Even though a dispatch interface does not directly call methods through a vtable, making the methods pure virtual forces the COM class to implement them, or else an error results at compile time. Without such a compile time check, errors might only be found at run time, which is a disadvantage of conventional dispatch interface implementation techniques.

The interface ITest includes the method Score and methods to manipulate the property Grade. The first method for Grade is a "propput" method, which sets the property Grade, while the second method for Grade is a "propget" method, which retrieves the property Grade. Each of the methods in ITest is annotated with an "id" IDL attribute to assign a DISPID. The DISPID 18 annotates the method Score. The DISPID 34 annotates the first two methods for Grade because these methods have the same name. A flag is used to distinguish between the "propput" method and the "propget" method. These DISPIDs are used when generating implementation code for GetIDsOfNames and Invoke. Compared to type library implementations of dispatch interfaces (in which the type library essentially provides an early binding virtual function table mechanism), providing IDL information about the correspondence between DISPID and method name improves flexibility in distributed computing applications.

Arguments for the member functions of ITest are annotated with the directional IDL attributes "in," "out," and "retval." The compiler uses these IDL attributes and type information for the arguments when creating code for packing and unpacking arguments.

The code portion 530 includes C++ code for the coclass CTest that exposes the interface ITest. The code portion 530 includes a simplified implementation for each of the methods of ITest. Several IDL attributes annotate the object CTest. The IDL attribute "coclass" annotates the struct CTest as a COM class, and the other IDL attributes indicate additional information for CTest.

FIG. 6 shows an exemplary listing for a C++ source code file 600 that includes a statement 620 to import a type library TestLib.tlb and a code portion 630 for the coclass CTest.

TestLib.tlb includes definition information that is roughly equivalent to the embedded IDL of the code portions 510 and 520 in FIG. 5. The compiler uses this information in TestLib.tlb in the same way it uses embedded IDL information when generating a dispatch interface implementation.

IV. Programming Environment

Figure 7:
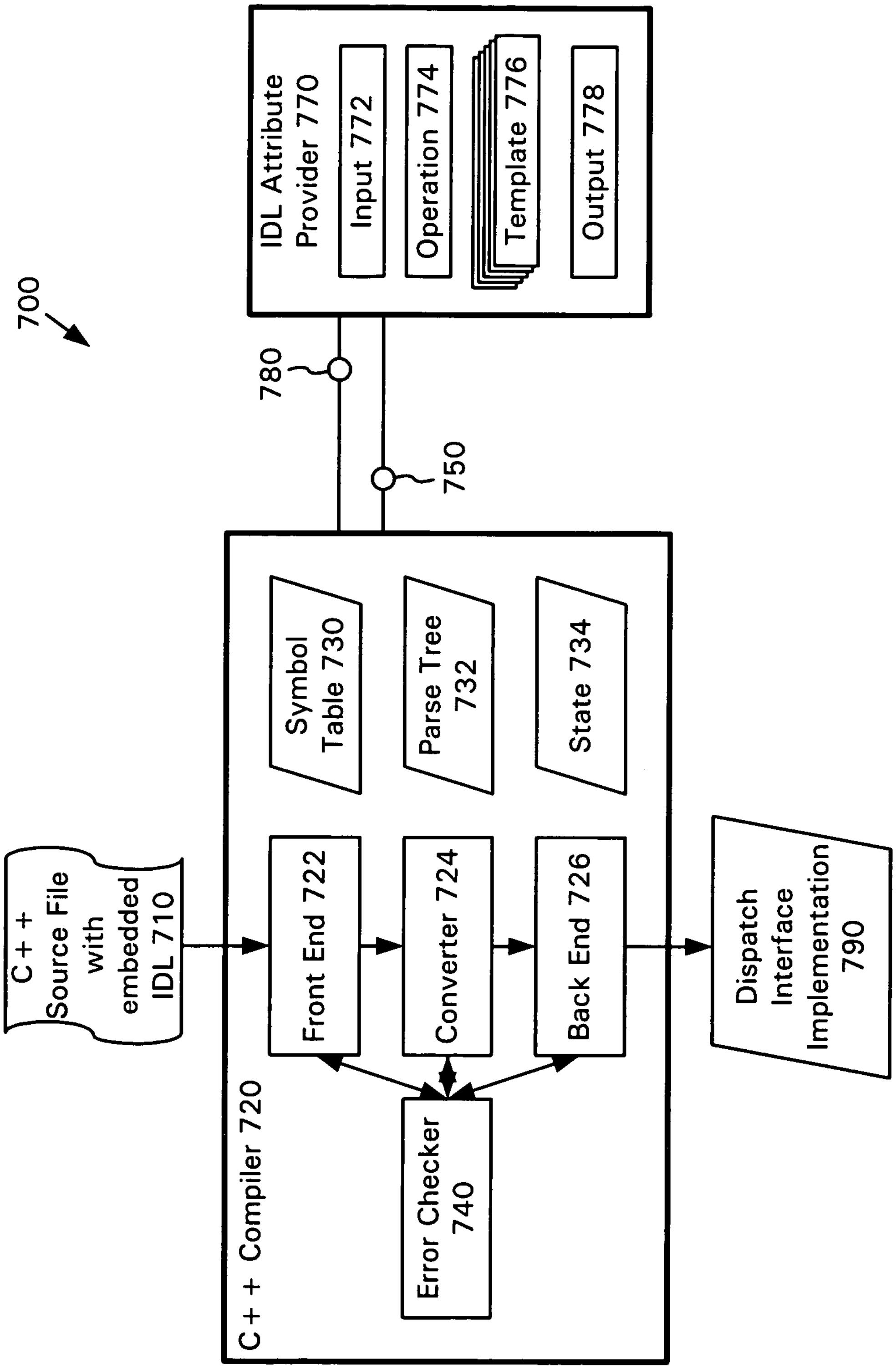
FIG. 7 is a block diagram of a C++ compiler that generates dispatch interface implementations.

FIG. 7 shows a block diagram of a compiler environment 700 used to generate dispatch interface implementations according to the illustrative embodiment. The compiler environment 700 includes a compiler 720 that accepts C++ code 710 with embedded IDL information as input, and produces a dispatch interface implementation 790 as output. Alternatively, a compiler accepts C++ code that imports a type library with definition information. In alternative embodiments, another type of programming environment is used to create a late binding interface implementation. In one alternative embodiment, a Java compiler environment produces virtual machine instructions (e.g., bytecodes) for a late binding interface implementation.

Modules in the compiler environment 700 recognize embedded IDL constructs in C++ source code, create a unified representation of the embedded IDL and C++ source code in a parse tree, and derive semantic meaning from the embedded IDL. The compiler environment 700 also provides error detection for the C++ code 710 and embedded IDL information.

The compiler environment 700 includes a C++ compiler 720 that accepts as input a file 710 having C++ source code with embedded IDL. The C++ code includes code for implementing the late bound methods of an interface, while the IDL information defines dispatch features of the interface. The compiler environment 700 processes the file 710 in conjunction with one or more IDL attribute providers 770. Although FIG. 7 depicts a single IDL attribute provider 770, the compiler 720 can work with multiple IDL attribute providers (e.g., different providers for different IDL constructs). Alternatively, the functionality of the provider 770 can be merged with the compiler 720.

A front end module 722 reads and performs lexical analysis upon the file 710. Basically, the front end module 722 reads and translates a sequence of characters in the file 710 into syntactic elements, or "tokens," indicating constants, identifiers, operator symbols, keywords, punctuation, etc.

A converter module 724 parses the tokens into an intermediate representation. For tokens from C++ source code, the converter module 724 checks syntax and groups tokens into expressions or other syntactic structures, which in turn coalesce into statement trees. Conceptually, these trees form a parse tree 732. As appropriate, the converter module 724 places entries into a symbol table 730 that lists symbol names and type information used in the file 710 along with related characteristics. A symbol table entry for a particular symbol can have a list of IDL attributes associated with it.

A state 734 tracks progress of the compiler 720 in processing the file 710 and forming the parse tree 732. For example, different state values indicate that the compiler 720 has encountered an IDL attribute, is at the start of a class definition or a function, has just declared a class member, or has completed an expression. As the compiler 720 progresses, it continually updates the state 734. The compiler 720 may partially or fully expose the state 734 to an outside entity such as the provider 770, which can then provide input to the compiler 720.

Based upon the symbol table 730 and the parse tree 732, a back end module 726 translates the intermediate representation of file 710 into output code. The back end module 726 converts the intermediate representation into instructions executable in a target processor, into memory allocations for variables, and so on. In FIG. 7, the output code is executable in a real processor, but in alternative embodiments the output code is executable in a virtual processor.

The front-end module 722 and the back-end module 726 can perform additional functions, such as code optimization, and can perform the described operations as a single phase or multiples phases. Except as otherwise indicated, the modules of the compiler 720 are conventional in nature, and can be substituted with modules performing equivalent functions.

In FIG. 7, the provider 770 indicates how to integrate tokens for IDL constructs into the intermediate representation, for example, adding IDL attributes to a symbol table entry for a particular symbol or manipulating the parse tree 732. Thus, embedded IDL information is associated with logically proximate programming language information in the symbol table 730 and the parse tree 732.

In FIG. 7, the provider 770 is external to the compiler 720, and communicates with the compiler 720 across the interfaces 750 and 780. FIG. 7 depicts a simplified interface configuration of the interface 750 exposed by the compiler 720 and the interface 780 exposed by the provider 770. Alternative interface configurations are possible.

The provider 770 includes several modules. An input module 772 receives a particular IDL attribute from a tag and parses it for parameters, values, properties, or other specifications. The interfaces 750 and 780 define how this information is passed between the compiler 720 and the provider 770.

An operation module 774 determines what must be done to implement the IDL attribute, and identifies locations where code is to be injected, or where other operations are to be carried out. "Injected code" typically includes added statements, metadata, or other elements at one or more locations, but this term also includes changing, deleting, or otherwise modifying existing source code. Injected code can be stored in the provider 770 as one or more templates 776, or in some other form. In addition, parse tree transformations may take place, such as altering the list of base classes or renaming identifiers.

An output module 778 communicates back to the compiler 720 to effect changes based upon the IDL attributes. In FIG. 7, the output module 778 directly manipulates internal compiler structures such as the symbol table 730 and the parse tree 732, creating symbols, adding to the parse-tree, etc. Alternatively, the output module 778 writes injected code to an external file (not shown) or send code directly to the compiler 720 as a stream of bytes (not shown) that the compiler 720 processes. Having an IDL attribute provider instruct the compiler (e.g., at converter module 724) to perform the operations gives a measure of security—the compiler 720 can reject or modify any request that would compromise proper functioning.

As the front end module 722 encounters IDL attribute tags in the file 710, the compiler 720 changes the state 734 appropriately and saves the IDL attribute tags in a list. This list also identifies the location of the provider 770 or any other needed attribute provider, as necessary acquiring location information from a utility such as a registry.

The compiler 720 communicates the state 734 to the provider 770. When the provider 770 detects a point at which it desires to perform an operation, it signals the compiler 720 and effects changes in one of the ways mentioned above. Thus, based upon the semantics of the embedded IDL, the provider 770 affects the states and structures of the compiler 720.

At various points during the processing of the file 710, an error checker module 740 checks for errors in the C++ source code with embedded IDL. In conjunction with the front end module 722, the error checker module 740 detects errors in lexical structure of C++ source code tokens and embedded IDL tokens. With converter module 724, error checker 740 detects any syntactical errors in the organization of C++ source code tokens and embedded IDL tokens. The error checker module 740 can also flag certain semantic errors in the embedded IDL in the C++ source code with embedded IDL.

Figure 8:
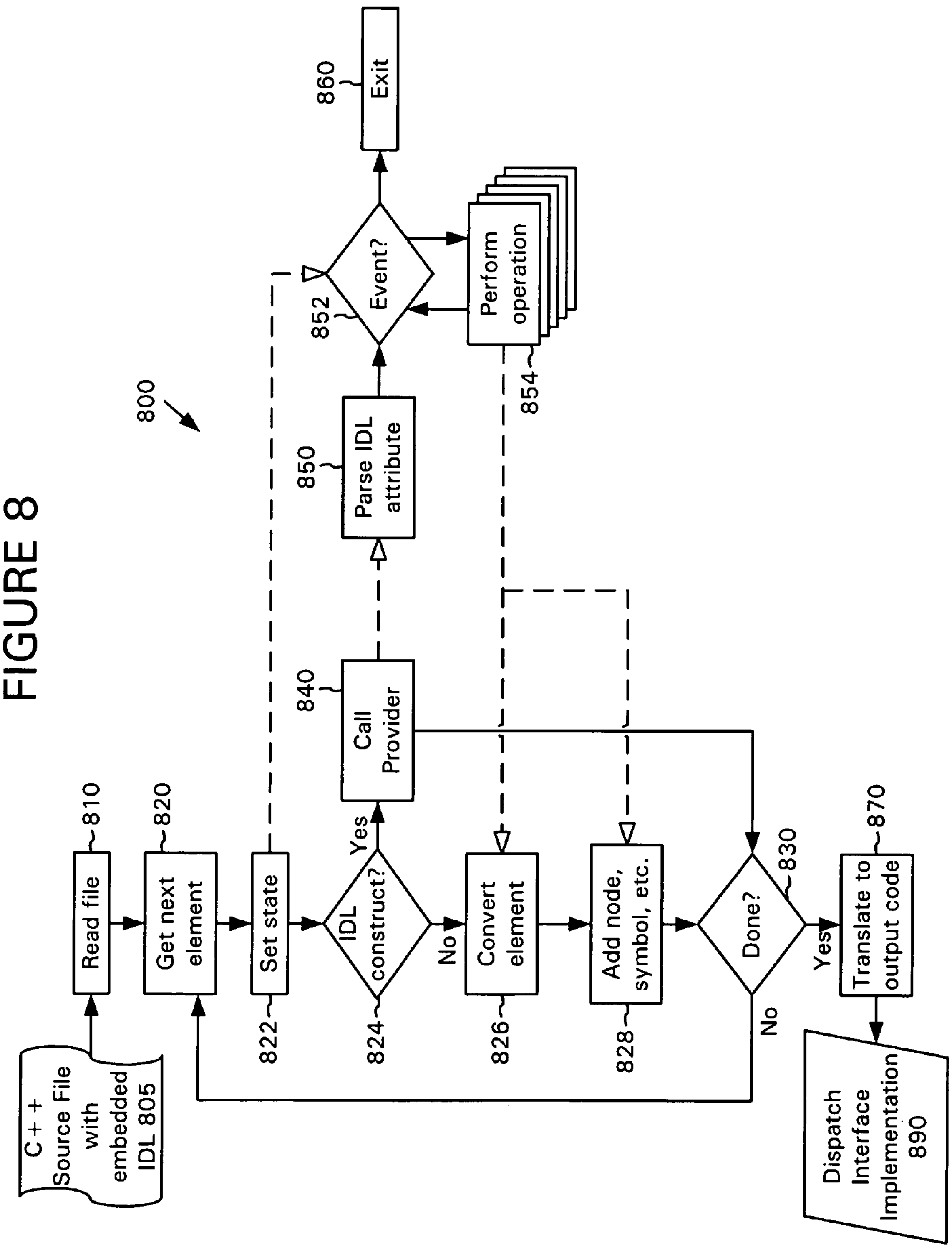
FIG. 8 is a flow chart showing generation of a dispatch interface implementation by the compiler of FIG. 7.

FIG. 8 shows a technique 800 for processing IDL embedded in C++ source code in a compiler environment such as that shown in FIG. 7. Alternatively, technique 800 can be performed by a different configuration of modules.

After a compiler reads in (act 810) the file 805, the elements of the file 805 are processed. The compiler gets (act 820) a syntactic element of the file 805 and sets (act 822) an appropriate state for that element. The compiler determines (act 824) whether that element is for a conventional C++ construct or for an IDL construct.

If the current element is for a C++ construct, the compiler converts (act 826) that element into an intermediate language. As appropriate, the compiler handles (act 828) the element, for example, by placing a node in the parse tree or adding an entry to the symbol table. If the compiler determines (act 830) that the file 805 includes more elements, the compiler proceeds with the next element.

If the current element is for an IDL construct, the compiler gets attribute information for the IDL construct. The compiler calls (act 840) an IDL attribute provider, transmitting any parameters or other data accompanying the attribute in the construct. The IDL attribute provider parses (act 850) the passed IDL attribute information.

The IDL attribute provider executes concurrently with the compiler, and more than one IDL attribute provider can be active and executing concurrently during compilation. The IDL attribute provider is loaded upon encountering the first IDL attribute, and stays loaded for the duration of the compile operation. In this way, the IDL attribute provider acts as a domain-specific compiler plug-in that is called to parse constructs that are "registered" as part of its domain.

While executing concurrently with the compiler, the IDL attribute provider detects (act 852) the occurrence of designated events within the compiler, for example, events related to the state of compilation (in FIG. 8, represented by a dashed arrow from act 822 to act 852). The compiler exposes a compilation state to the IDL attribute provider. Examining the state, the IDL attribute provider determines whether to do nothing or to perform (act 854) an operation. Thus, the IDL attribute provider can wait until the compiler reaches a certain state, and then perform an operation when that state is reached, for example, requesting the compiler to modify the parse tree. The IDL attribute provider then waits for another event.

The IDL attribute provider can perform different operations for different events that might occur within the compiler, and for different parameters transmitted with an IDL attribute. Among these operations are injection of statements or other program elements, possibly employing templates, and modifying or deleting code. Other operations include adding new classes, methods and variables, or modifying existing ones. Modification can include renaming and extending an object or construct. In FIG. 8, dashed arrows from act 854 to acts 826 and 828 represent the passing of code, state information, instructions, or other data to the compiler as described above.

Injected code is typically located remotely from where the IDL attribute appears in the C++ source code. Code can be injected at multiple locations as well. To clarify the significance of the injected code, comments around the injected code can identify the IDL attribute for which it was injected.

The scope of an IDL attribute is not bound to the scope of its associated C++ construct (variable, class, etc., see Table 1). Rather, the scope of an IDL attribute can extend beyond the point of its use. In most cases, however, an IDL attribute affects semantics in the context of its associated C++ construct. In FIG. 5, for example, the "export" IDL attributes are coextensive with the scope of their respective type definitions, and the "dispinterface" IDL attribute operates over the ITest interface declaration.

When the file 805 has been completely processed, the compiler translates (act 870) the intermediate representation into a dispatch interface implementation 890. When the compiler finishes the compile operation, the IDL attribute provider exits (act 860).

Although FIG. 8 depicts acts in a particular order, per conventional compiler techniques, many of these acts can be rearranged or performed concurrently. For example, the acts of reading the file, getting elements, determining significance, and translating to output code can be overlapped to some extent.

V. Late Binding Interface Implementation

FIGS. 9*a*–9*d* show a technique 900 for generating a dispatch interface implementation from C++ source code and definition information. Using a compiler to perform the technique 900, a programmer easily and systematically creates a dispatch interface implementation. Moreover, the compiler considers the latest definition information for a dispatch interface, which saves the programmer from wading through wizard-generated code to make changes.

The technique 900 can be performed by a compiler such as the one shown in FIG. 7, by a different configuration of modules, or by another type of programming environment. In one alternative embodiment, the late binding interface implementation that is output by a compiler environment contains bytecode instructions for a virtual processor.

FIGS. 10*a*–10*f* are a source code listing 1000 representative of a compiler-generated dispatch interface implementation. Because the listing 1000 is in source code form, it is merely representative of the compiler output, which can be and typically is in a computer executable form. For the sake of presentation, the original C++ and bracketed IDL attributes are presented in boldface. The code generated based upon the semantics of the definition information for the dispatch interface is presented in lighter type.

The dispatch interface implementation in the listing 1000 lacks calls to separate dispatch interface implementations (such as those provided in a type library, another class, or a dispatch map structure). As such, the dispatch interface implementation in the listing 1000 is relatively efficient at run time, avoiding the run time overhead associated with such additional run time calls.

Figure 9B:
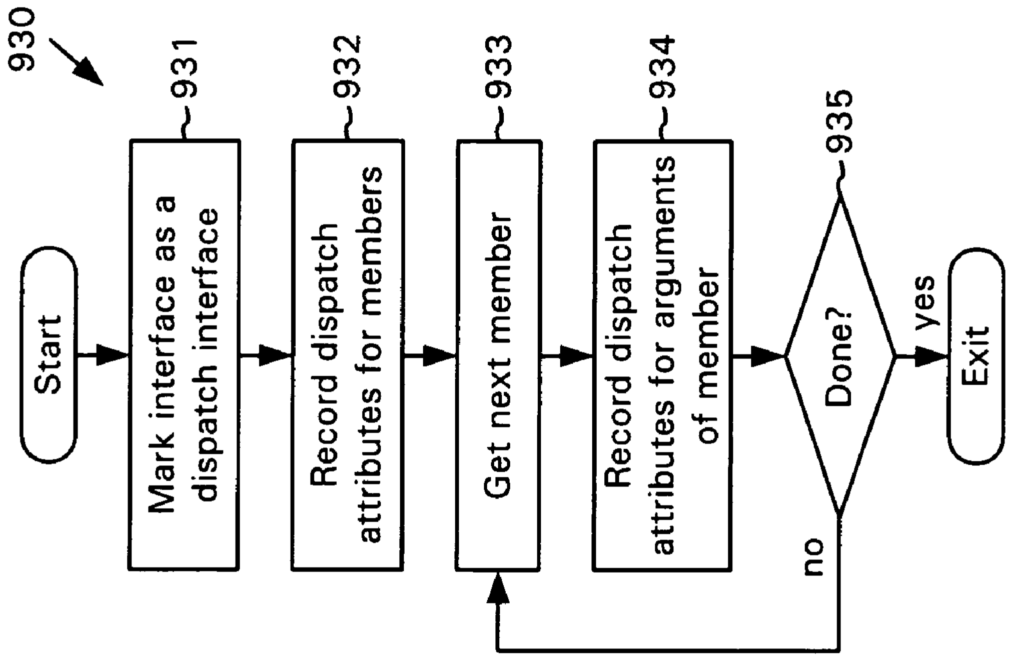
FIGS. 9*a*–9*d* are a flow chart showing generation of a dispatch interface implementation from C++ source code and definition information.
Figure 9A:
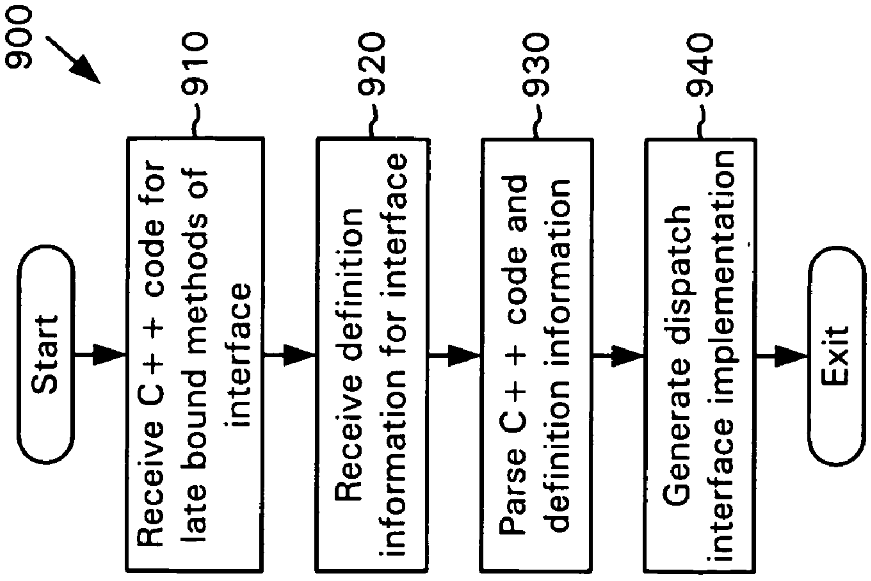

With reference to FIG. 9*a*, the compiler receives (act 910) C++ code for implementing the late bound methods of the interface. The compiler also receives (act 920) definition information for dispatch features of the interface. The definition information can be embedded in the C++ code, imported as part of a type library, or otherwise provided to the compiler. The compiler parses (act 930) the C++ code and definition information, and then generates (act 940) a dispatch interface implementation. The compiler also performs semantic checks on the dispatch interface. In alternative embodiments, other types of late binding interface implementations are created, other types of programming language are used, or other types of definition information are used.

FIG. 9*b* shows the parsing act 930 in greater detail. When the compiler encounters a declaration for a dispatch interface, the compiler marks (act 931) the interface as a dispatch interface and records (932) dispatch attributes (e.g., DISPIDs, property flags) for the members of the interface. The compiler analyzes each member (acts 933–935), recording (act 934) dispatch attributes and types for the arguments of the member. Later, when the compiler encounters a class that implements the dispatch interface, the compiler has the necessary information to implement the methods of IDispatch for the interface.

When processing the listing of FIG. 5, the compiler parses the declaration for ITest in the code portion 520. The compiler marks the underlying symbol as a dispatch interface and records the DISPIDs of each of the members of ITest. The property Grade has two member functions for the DISPID 34, but the property flag (e.g., "propput," "propget") is also recorded.

The compiler then parses each member function in the declaration of ITest, recording the attributes on function arguments. For the method Score, the compiler records the attributes for the input arguments a, b, and c. The compiler later uses type information for the arguments when generating code for unpacking and type coercing the arguments a, b, and c from a DISPPARAMS structure. For the propget method of the property Grade, the "retval" attribute indicates that the VARIANT pVarResult argument of the method Invoke is to be filled in by the value at the argument pc. The compiler later uses this information when generating code for packing and type coercing the argument into the VARIANT structure.

When the compiler encounters the "coclass" attribute for the struct CTest in the code portion 530, the compiler gets a basic implementation for the three IUnknown methods (and a hidden implementation of IClassFactory) from an associated template library (Microsoft Corporation's Active Template Library ["ATL"]). When the compiler determines that the base class of the struct CTest is ITest, the presence of the "coclass" attribute instructs the compiler to generate an implementation for the four IDispatch methods that are not in IUnknown.

Figure 9D:
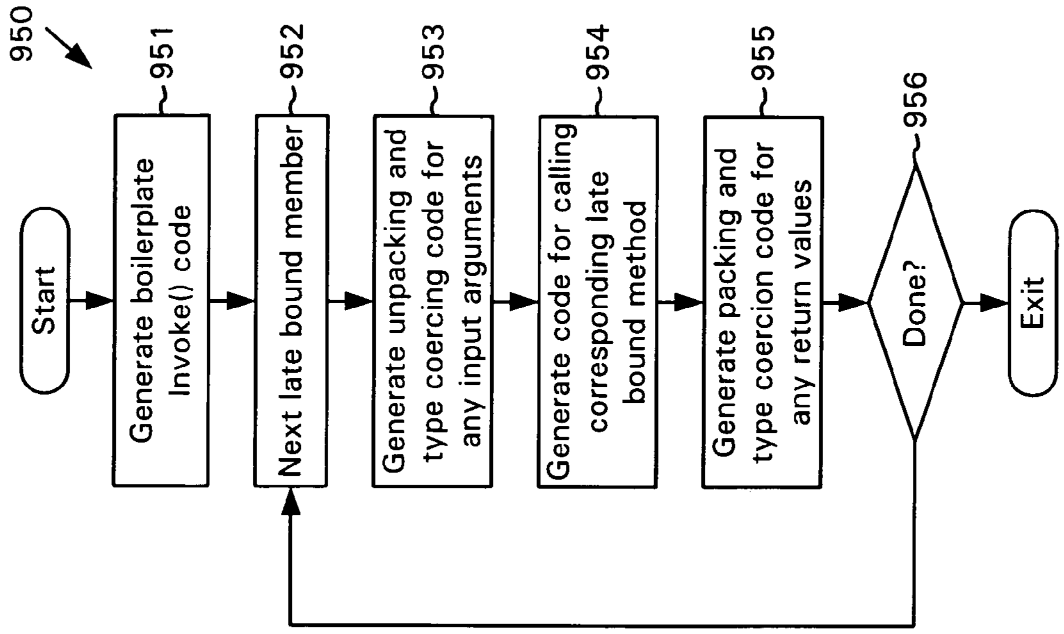
Figure 9C:
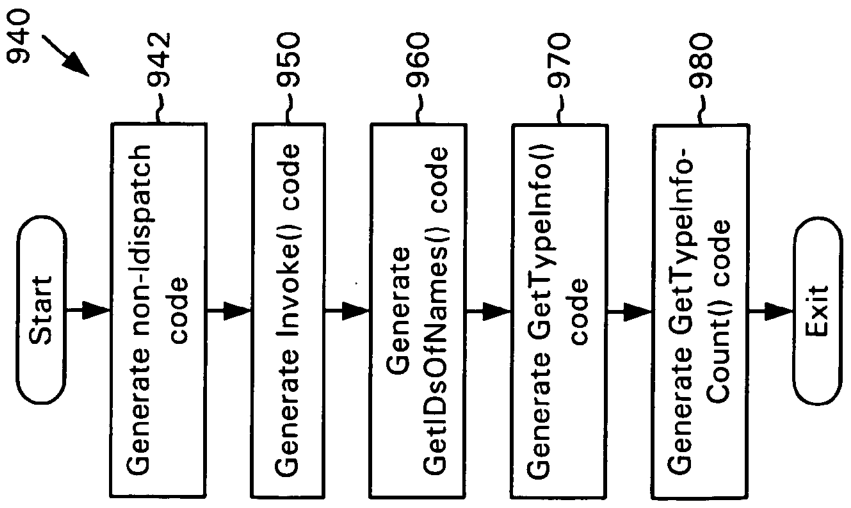

FIG. 9*c* shows the act 940 of generating a dispatch interface implementation in greater detail. The compiler generates (act 942) non-IDispatch code such as that represented in the code portion 1010. The code portion 1010 includes code provided through ATL for several base classes of CTest. The code portion 1010 also includes code for the late bound methods of the interface ITest (put_Grade, get_Grade, and Score), which comes from the original C++ code.

Next, the compiler generates (act 950) code to implement the method Invoke, such as that represented as the code portion 1020 in FIGS. 10*b* and 10*c*. With reference to FIG. 9*d*, the compiler generates (act 951) boilerplate code, such as the code portions 1022 and a switch statement. Although the switch statement switches on DISPID, for DISPID 34 "wFlags" is checked to distinguish between put_Grade and get_Grade.

For each late bound member of the interface (acts 952–956), the compiler generates (act 953) unpacking and type coercing code for any input arguments. The code portion 1024 is for placing values from the DISPPARAMS structure into i1, i2, and i3. In this code portion, macros of the form V_<some type>(native data) represent the unpacking and type coercing. Microsoft Corporation's OLE provides a set of macros for converting between types for VARIANTs in this way. The native data from the DISPPARAM structure, as packed by the client, is coerced as necessary into a type appropriate for passing to the late bound method. The code portions 1034 and 1044 include code for unpacking and type coercing arguments for put_Grade and get_Grade, respectively.

The compiler next generates (act 954) code for calling the late bound method corresponding to the DISPID and property flags passed to the method Invoke. This code uses the standard signature for invoking the method. In the code portion 1026, the method Score is called with the arguments i1, i2, and i3, and an HRESULT hr is returned. The code portions 1036 and 1046 include code for calling put_Grade and get_Grade, respectively.

The compiler then generates (act 955) packing and type coercion code for any return values. The code portion 1028 is for placing an error value and the value hr into the VARIANT at pVarResult. In this code portion, the packing and type coercing are again represented as a macro. The code portion 1048 includes code for packing and type coercing return values for get_Grade. The method put_Grade, as a property put, does not have a return value.

After generating code for the method Invoke, the compiler generates (act 960) code for the method GetIDsOfNames. Generally, the compiler establishes a correspondence between late bound members of the dispatch interface and corresponding DISPIDs. The code portion 1050 includes code for initializing an array of names "names[ ]" to "Grade" and "Score." This code portion also includes code for initializing a corresponding array of DISPIDs to 34 and 18. Each name in a passed in array of names is compared to each name in the initialized array of names, and a DISPID is assigned when a match occurs.

Next, the compiler generates (act 970) code for the method GetTypeInfo and generates (act 980) code for the method GetTypeInfoCount. For this purpose, the compiler generates code that locates a type library and an ITypeInfo interface corresponding to the dispatch interface. If a type library does not exist, stub implementations are generated for GetTypeInfoCount and GetTypeInfo. The code portions 1060 and 1070 show the implementations for GetTypeInfoCount and GetTypeInfo, respectively. Each of these calls TypeInfoHelper, a method implemented in CTest at the code portion 1080. The method TypeInfoHelper accepts an identifier for the dispatch interface, locates and loads a type library, gets the ITypeInfo interface for the dispatch interface, and returns the ITypeInfo interface.

Although FIGS. 9*a*–9*d* depict acts in a particular order, per conventional implementation techniques, many of these acts can be rearranged. For example, the acts of generating code for particular dispatch methods can be rearranged.

VI. Client Side Call Site Code

Figure 11B:
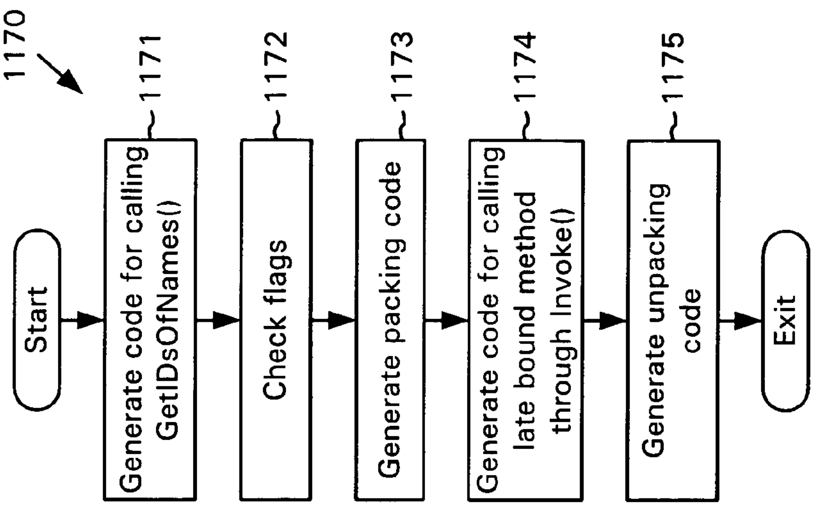
FIGS. 11*a*–11*b* are a flow chart showing generation of a client-side code for calling a member function of a dispatch interface.
Figure 11A:
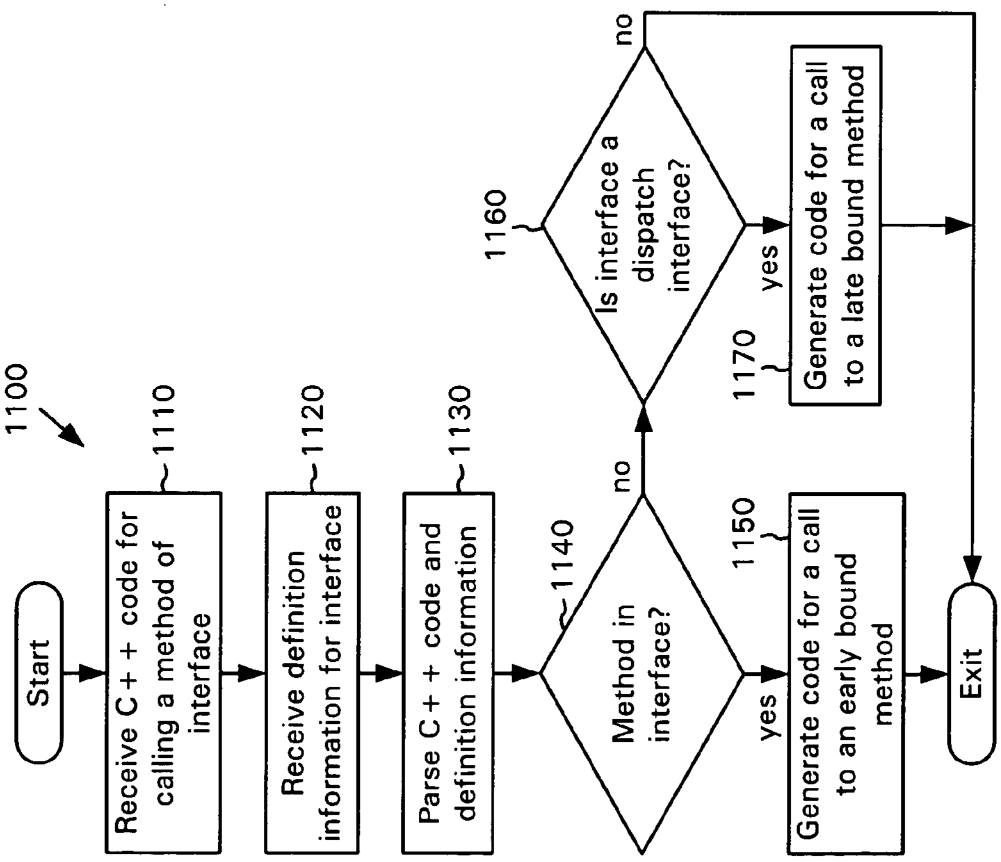

FIGS. 11*a* and 11*b* show a technique 1100 for generating client-side code for calling a late bound method of a late binding interface. The technique 1100 can be performed by a compiler such as the one shown in FIG. 7, or can be performed by a different configuration of modules. For alternative embodiments, client-side code appropriate for a particular type of late binding interface is generated.

The compiler receives (act 1110) C++ code for calling a method of an interface. The compiler also receives (act 1120) definition information for dispatch features of the interface. The compiler parses (act 1130) the C++ code and definition information, as described above with respect to FIG. 9*b*.

The compiler determines (act 1140) if the method is part of the interface per se (i.e., in the vtable for the interface), and if it is, the compiler generates (act 1150) code for calling the method through an early binding mechanism.

If the method is not part of the interface per se, the compiler checks (act 1160) whether the interface is a dispatch interface. If so, the compiler generates (act 1170) code for calling the late bound method. To do this, the compiler first generates (act 1171) code for calling GetIDsOfNames. If the compiler already has DISPID information, it can skip this step. The compiler then determines (act 1172) whether the call should be to a method, a property put, a property get, etc. by checking the corresponding indicators in the definition information.

Next, the compiler generates (act 1173) code for packing any arguments for the late bound method into a DISPPARAMS structure. For this purpose, the compiler uses type information and dispatch interface information for the function arguments presented in the definition of the dispatch interface.

The compiler generates (act 1174) code for calling the late bound method through the method Invoke, passing the corresponding DISPID, the DISPPARAMS structure, a pointer to the VARIANT structure for the return value, and other information.

For a method call or a property get, the compiler then generates (act 1175) code for unpacking any returned arguments for the late bound method from a VARIANT structure returned from Invoke. For this purpose, the compiler again uses information presented in the definition of the dispatch interface.

Although FIGS. 11*a* and 11*b* depict acts in a particular order, per conventional code generation techniques, many of these acts can be rearranged.

Having described and illustrated the principles of our invention with reference to an illustrative embodiment, it will be recognized that the illustrative embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the illustrative embodiment shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. In a computer system, a method of generating a dispatch interface implementation, the method comprising:

receiving definition information that defines dispatch interface features of a dispatch interface, the dispatch interface including plural dispatch methods and one or more other methods;

receiving programming language code for the one or more other methods, each of the one or more other methods having a name;

generating a dispatch interface implementation for operating the one or more other methods, wherein the generating includes parsing the programming language code and the definition information during compilation, the dispatch interface implementation including:

executable code for the one or more other methods;

executable code for a first dispatch method, the first dispatch method for mapping the names to corresponding dispatch identifiers for binding at run time; and executable code for a second dispatch method, the second dispatch method for calling the one or more other methods at run time responsive to client requests, each client request including a dispatch identifier.

2. The method of claim 1 wherein the definition information is embedded in a file for the programming language code.

3. The method of claim 1 wherein a file includes the programming language code and a statement for importing the definition information.

4. The method of claim 1 wherein the generating comprises:

in the second dispatch method executable code, creating code for handling the arguments of one of the one or more other methods with a generic data structure.

5. The method of claim 1 wherein the dispatch interface implementation is part of a dual interface implementation, the method further comprising:

generating executable code for directly invoking the one or more other methods through a vtable mechanism at run time.

6. The method of claim 1 wherein the dispatch interface implementation further includes:

executable code for a third dispatch method, the third dispatch method for determining the availability of type information for the dispatch interface; and executable code for a fourth dispatch method, the fourth dispatch method for retrieving available type information for the dispatch interface.

7. A computer readable medium having stored thereon a computer executable compiler system that generates a late binding interface implementation from definition information and programming language code, the compiler system comprising:

a front end module that receives definition information and programming language code, the definition information defining late binding interface features of a late binding interface, the programming language code for implementing one or more late bound methods;

a converter module that identifies relations between the definition information and the one or more late bound methods during compilation, including parsing the definition information and the programming language code; and a back end module that generates a late binding interface implementation based upon the relations, the late binding interface implementation for operating the one or more late bound methods.

8. The computer readable medium of claim 7 wherein the converter module identifies one or more relations, each relation between one of the one or more late bound methods and a corresponding identifier, and wherein based upon the one or more relations the back end module generates for each of the one or more late bound methods code mapping the name of the late bound method to the corresponding identifier for the late bound method.

9. The computer readable medium of claim 7 wherein the converter module identifies one or more relations, each relation between one of the one or more late bound methods and a corresponding identifier, and wherein based upon the one or more relations the back end module generates for each of the one or more late bound methods code for calling the late bound method upon receipt of the corresponding identifier for the late bound method.

10. The computer readable medium of claim 7 wherein the converter module identifies one or more relations, each relation between type information and an argument of one of the one or more late bound methods, and wherein based upon the one or more relations the back end module generates code for handling the arguments of the late bound method with a generic data structure.

11. The computer readable medium of claim 7 wherein the converter module identifies a relation between a property indicator and one of the one or more late bound methods, and wherein based upon the relation the back end module generates code for retrieving or setting a corresponding property through the late bound method.

12. The computer readable medium of claim 7 wherein the late binding interface implementation is part of a combined early binding and late binding interface implementation, and wherein the back end module further generates an early binding interface implementation for the one or more late bound methods.

13. A computer readable medium having stored thereon computer executable instructions for performing a method of automatically generating a late binding interface implementation, the method comprising:

receiving programming language code for one or more late bound methods of a late binding interface;

receiving definition information that defines late binding interface features of the late binding interface; and generating a late binding interface implementation for operating the one or more late bound methods, wherein the generating includes parsing the programming language code and the definition information during compilation, the late binding interface implementation including one or more late binding methods, wherein the one or more late binding methods include a first late binding method for calling the one or more late bound methods responsive to client requests.

14. The computer readable medium of claim 13 wherein the first late binding method lacks a call to a separate late binding interface implementation.

15. The computer readable medium of claim 13 wherein the one or more late binding methods further include a second late binding method for mapping names of the one or more late bound methods to corresponding identifiers for run time binding, and wherein the second late binding method lacks a call to a separate late binding interface implementation.

16. The computer readable medium of claim 13 wherein the one or more late binding methods further include a second late binding method for determining the availability of type information, and wherein the one or more late binding methods further include a third late binding method for retrieving available type information.

17. The computer readable medium of claim 13 wherein the definition information is embedded in a file for the programming language code.

18. The computer readable medium of claim 13 wherein the generating comprises:

identifying type information for an argument of a first late bound method of the one or more late bound methods; and for the implementation for the first late binding method, generating code for handling the argument with a generic data structure.

19. The computer readable medium of claim 13 wherein the late binding interface implementation adjoins an early binding interface implementation, the method further comprising:

generating the early binding interface implementation for directly invoking the one or more late bound methods.

20. In a computer system, a method of automatically generating an interface implementation, the interface implementation having early binding and late binding mechanisms, the method comprising:

receiving programming language code for one or more methods of an interface;

receiving definition information that defines late binding interface features of the interface; and generating an interface implementation for alternatively operating the one or more methods by an early binding mechanism or by a late binding mechanism, wherein the generating includes parsing the programming language code and the definition information during compilation, wherein the early binding mechanism provides for direct invocation of the one or more methods, and wherein the late binding mechanism provides for invocation of the one or more methods responsive to a request through a late binding method.

21. The method of claim 20 wherein the late binding mechanism maps names of the one or more methods to corresponding identifiers at run time.

22. The method of claim 20 wherein the generating comprises:

identifying type information for an argument of a first method of the one or more methods; and for the late binding mechanism, creating code for handling the argument with a generic data structure.

23. In a computer system, a method of automatically generating client side call site code for calling a late bound method through a late binding interface, the method comprising:

receiving definition information for late binding interface features of a late binding interface;

receiving programming language code for calling a late bound method of the late binding interface;

parsing the definition information and the programming language code during compilation;

based upon type information for one or more input arguments of the late bound method, generating code for packing the one or more input arguments into a generic argument data structure; and generating code for calling the late bound method through an invocation method of the late binding interface, wherein the calling includes passing the generic argument data structure to the invocation method.

24. The method of claim 23 further comprising:

based upon type information for a return value of the late bound method, generating code for unpacking the return value from a generic return value data structure.

25. The method of claim 23 further comprising:

generating code for calling a mapping method of the late binding interface, the mapping method associating a late bound method name with an identifier.

26. The method of claim 1 wherein the second dispatch method has different arguments from each of the one or more other methods.

27. The computer readable medium of claim 7 wherein the late binding interface implementation includes one or more late binding methods each having different arguments from the one or more late bound methods.

28. The computer readable medium of claim 13 wherein the first late binding method has different arguments from each of the one or more late bound methods.

29. The method of claim 20 wherein the late binding method has different arguments from each of the one or more methods.

30. The method of claim 23 wherein the invocation method has different arguments from the late bound method.

* * * * *

UNITED STATES PATENT AND TRADEMARK OFFICE

CERTIFICATE OF CORRECTION

PATENT NO. : 7,100,153 B1 Page 1 of 1
APPLICATION NO. : 09/611402
DATED : August 29, 2006
INVENTOR(S) : Ringseth et al.

It is certified that error appears in the above-identified patent and that said Letters Patent is hereby corrected as shown below:

On the title page, in item (75), in "Inventors", in column 1, line 2, delete "Sridhad S. Madhugiri" and insert -- Sridhar S. Madhugiri --, therefor.

On page 2, in item (56), under "Other Publications", in column 2, line 9, delete "library." and insert -- library --, therefor.

In column 7, line 61, delete "FIGS. 5" and insert -- FIG. 5 --, therefor.

Signed and Sealed this

Twentieth Day of April, 2010

David J. Kappos
*Director of the United States Patent and Trademark Office*